(12) United States Patent
Hsia

(10) Patent No.: US 9,110,272 B2
(45) Date of Patent: Aug. 18, 2015

(54) OPTICAL ZOOMING APPARATUS FOR MINIATURE IMAGING SYSTEM

(71) Applicant: Kangmin Hsia, Fremont, CA (US)

(72) Inventor: Kangmin Hsia, Fremont, CA (US)

( * ) Notice: Subject to any disclaimer, the term of this patent is extended or adjusted under 35 U.S.C. 154(b) by 61 days.

(21) Appl. No.: 14/045,742

(22) Filed: Oct. 3, 2013

(65) Prior Publication Data

US 2015/0022695 A1    Jan. 22, 2015

Related U.S. Application Data

(60) Provisional application No. 61/856,639, filed on Jul. 19, 2013.

(51) Int. Cl.
*G02B 13/00* (2006.01)

(52) U.S. Cl.
CPC .................................... *G02B 13/009* (2013.01)

(58) Field of Classification Search
CPC .......... H04N 5/2356; G03B 3/00; G03B 3/02; G03B 3/04; G03B 3/06; G03B 3/10; G03B 3/12; G03B 13/32; G03B 13/34; G03B 13/36; G03B 7/09933; G03B 7/09991; G03B 13/00; G03B 21/53; G03B 27/34; G03B 17/14; G01C 3/32; G02B 7/04; G02B 7/09; G02B 7/10; G02B 7/102; G02B 7/346; G02B 7/343; G02B 7/305; G02B 7/285; G02B 26/08; G02B 6/35

See application file for complete search history.

(56) References Cited

U.S. PATENT DOCUMENTS

| | | | | |
|---|---|---|---|---|
| 8,098,320 | B2 * | 1/2012 | Nomura et al. | 348/344 |
| 2006/0092524 | A1 * | 5/2006 | Konno | 359/678 |
| 2009/0005112 | A1 * | 1/2009 | Sorek et al. | 455/556.2 |
| 2012/0044409 | A1 * | 2/2012 | Uchiyama | 348/345 |

* cited by examiner

*Primary Examiner* — Twyler Haskins
*Assistant Examiner* — Angel L Garces-Rivera
(74) *Attorney, Agent, or Firm* — Morgan, Lewis & Bockius LLP

(57) ABSTRACT

An optical apparatus is provided that includes a reflective component that reflects light from an optical axis to an optical plane substantially perpendicular to the optical axis. The apparatus further includes first and second lens units disposed within the optical plane, and an actuator mechanically coupled with the first and second lens units to cause concurrent first and second displacements, respectively. Light transmitted through the first and second lens units prior to the first and second displacements is imaged with a first magnification at a respective focal plane and light transmitted through the first and second lens units after the first and second displacements is image with a second magnification different from the first magnification at the respective focal plane, thereby effecting an optical zoom effect.

18 Claims, 16 Drawing Sheets

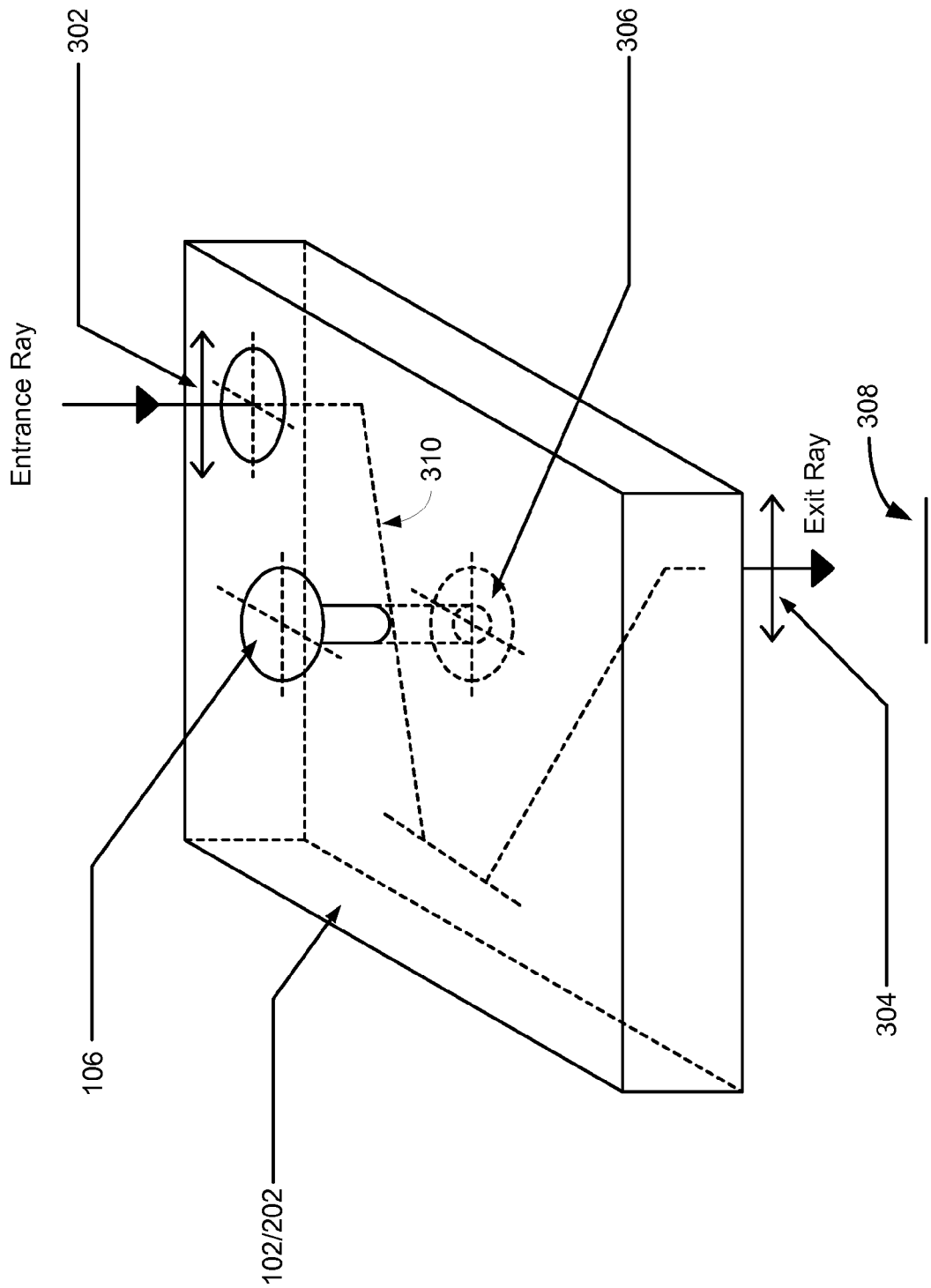

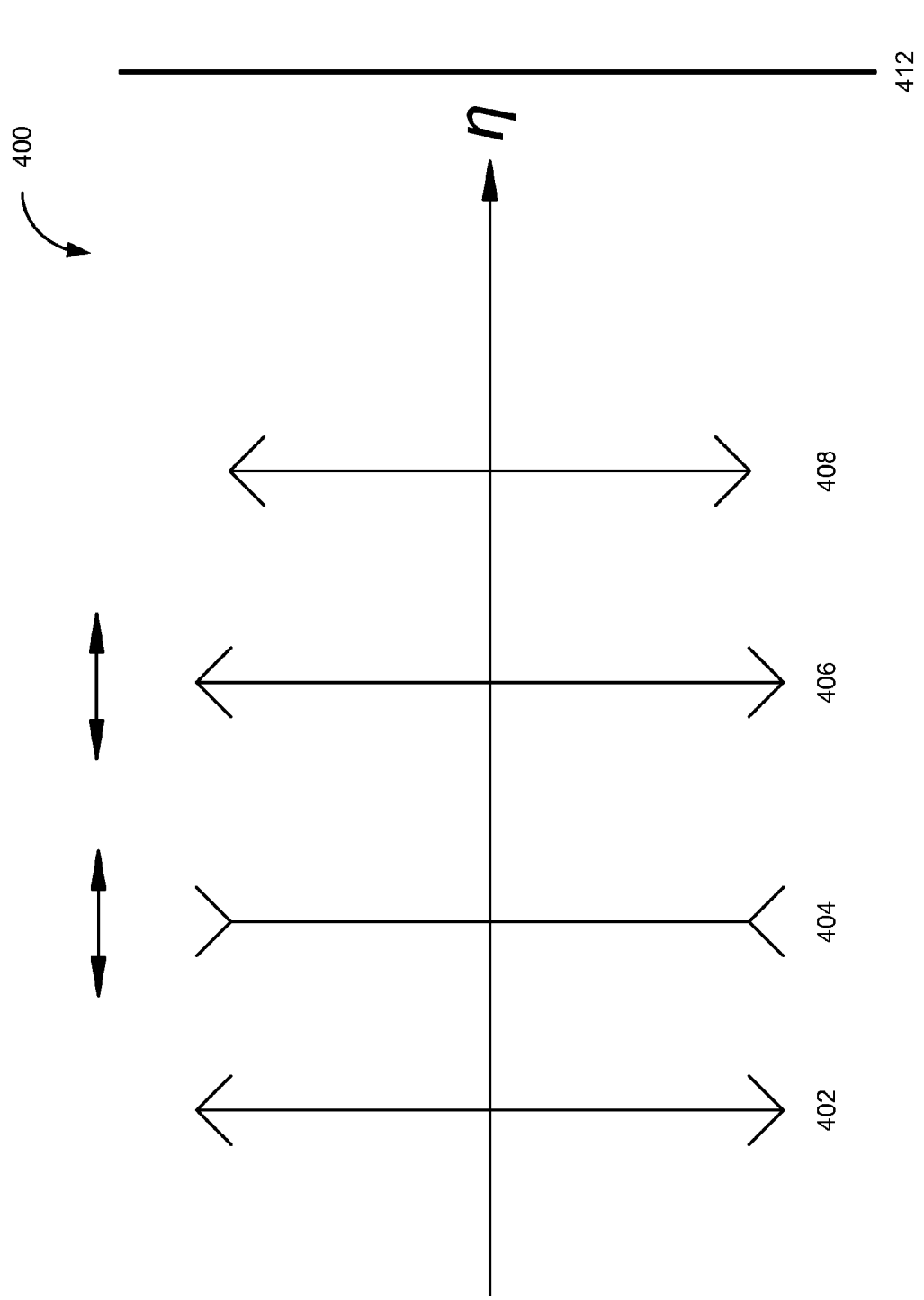

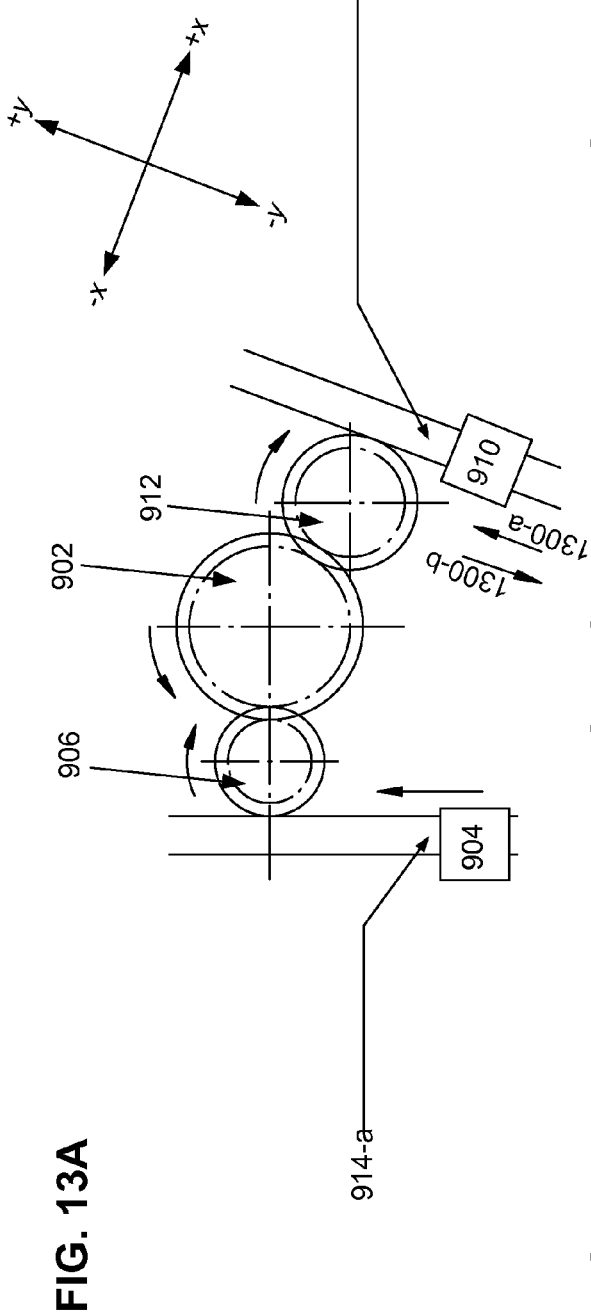
FIG. 13A
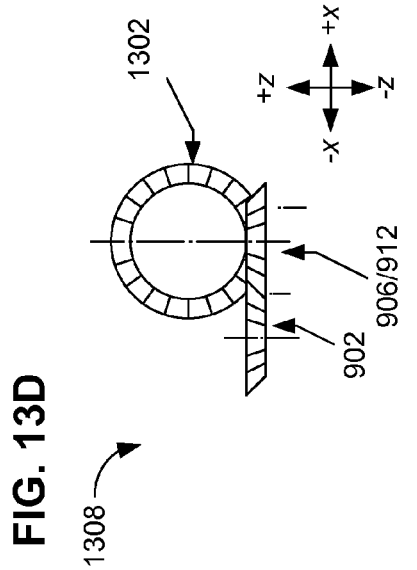
FIG. 13D
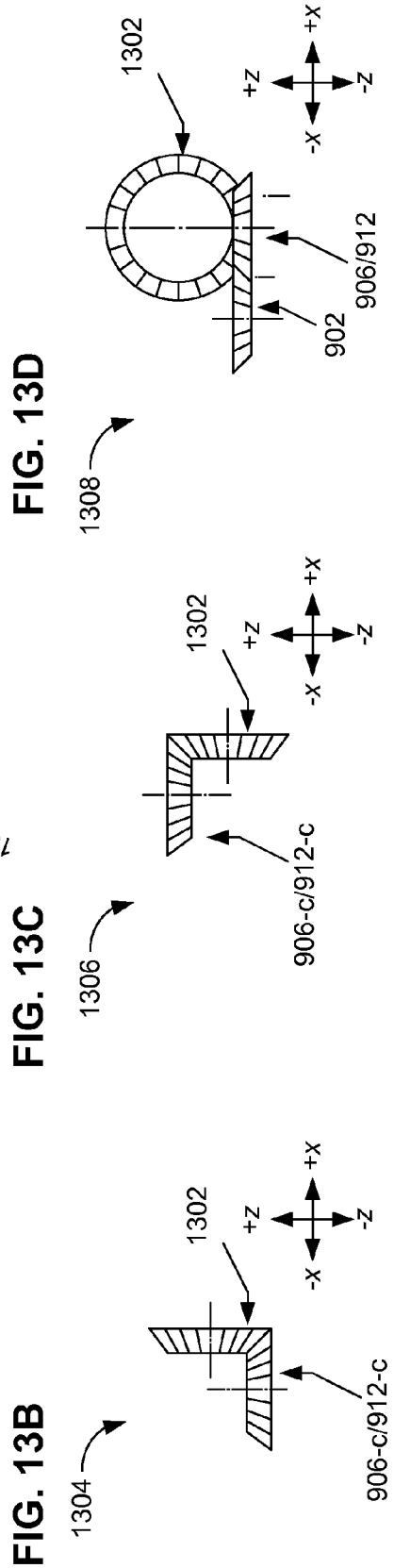
FIG. 13B
FIG. 13C

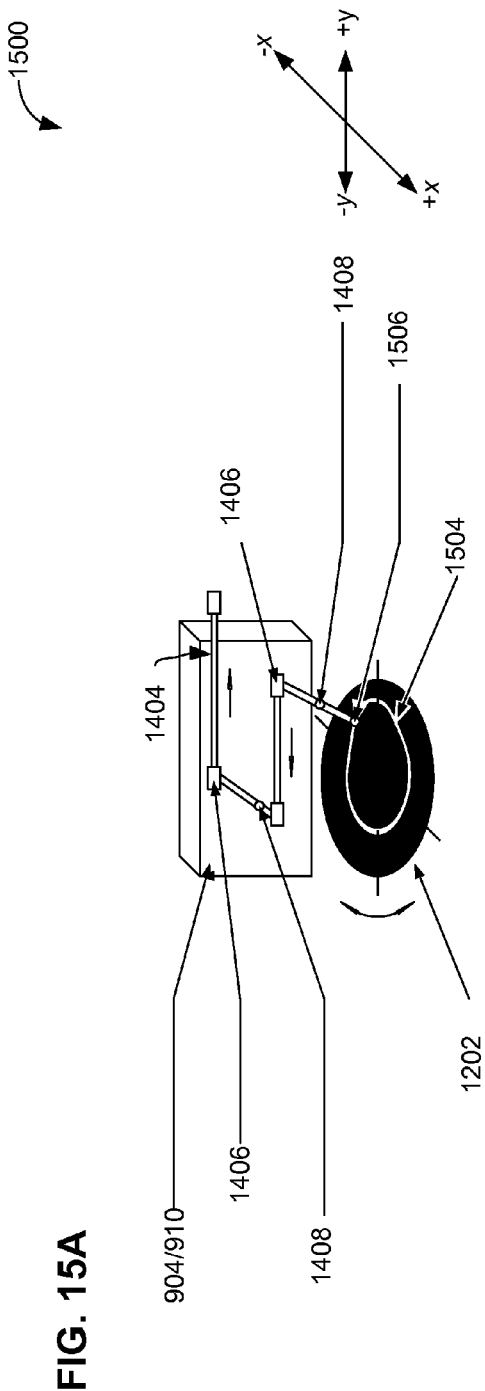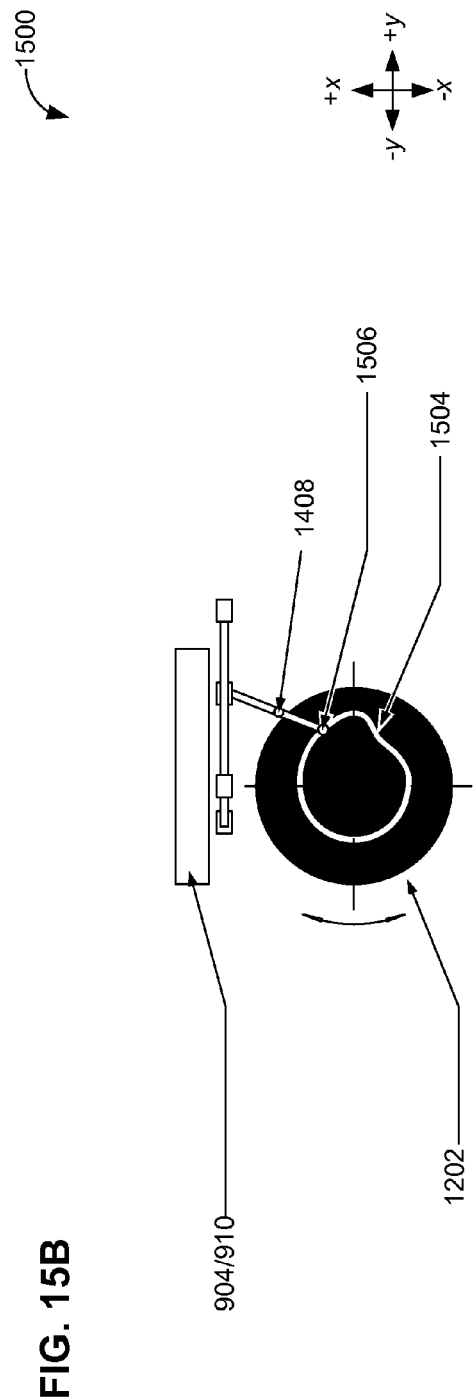

OPTICAL ZOOMING APPARATUS FOR MINIATURE IMAGING SYSTEM

RELATED APPLICATIONS

This application claims priority to U.S. Provisional Application 61/856,639, "Optical Zooming Apparatus for Miniature Imaging System," filed Jul. 19, 2013, which is incorporated herein by reference in its entirety.

TECHNICAL FIELD

The disclosed implementations relate generally to optical zooming apparatus. Specifically, the disclosed implementations relate to optical zooming apparatus for miniature imaging systems, such as smart/cellular phone cameras.

BACKGROUND

There are many imaging applications in which spatial restraints critically restrict the design of an image acquisition system (e.g., cameras and the lens systems therein). For example, in order for smart/cellular phones to be competitive on the marketplace, these devices must remain small enough to avoid inconveniencing users while being carried (e.g., in a user's pocket) at virtually all times. Similarly, hidden surveillance cameras must be small in order to remain discreet. Many other imaging applications exist in which design space is limited or very restricted for optical and mechanical components.

Although optical zooming in such imaging applications is highly desirable, optical zooming has not been implemented in such imaging applications due to the limited design space available. Moreover, smart/cellular phone cameras have trended towards being thinner and smaller in size. Since many smart/cellular phone cameras have optical axes that lie perpendicular to the thin dimension of device, and conventional optical zooming apparatus rely on movement of opto-mechanical components along the optical axis, such devices are ill-equipped for optical zooming by conventional optical zooming apparatus. Thus, such devices are frequently designed with a single lens or lens unit having a fixed focal length, thereby forgoing optical zooming capability.

Therefore, there is a need for a compact optical zooming apparatus that overcomes restricted spatial requirements.

SUMMARY

To address the aforementioned problems, some implementations provide an optical apparatus. The optical apparatus includes a first reflective component configured to reflect light from a first optical axis to an optical plane substantially perpendicular to the first optical axis. The optical apparatus further includes a first lens unit disposed within the optical plane, a second lens unit disposed within the optical plane, and an actuator mechanically coupled with the first lens unit to cause a first displacement of the first lens unit from a first position within the optical plane to a second position within the optical plane and mechanically coupled to the second lens unit to cause a second displacement of the second lens unit from a third position within the optical plane to a fourth position within the optical plane. The first and second displacements occur concurrently. Moreover, the first displacement of the first lens unit is compensated by the second displacement of the second lens unit such that light transmitted through the first lens unit in the first position and through the second lens unit in the third position is imaged with a first magnification at a respective focal plane and light transmitted through the first lens unit in the second position and through the second lens unit in the fourth position is imaged with a second magnification different from the first magnification at the respective focal plane, thereby effecting an optical zoom effect.

In some implementations, the actuator is mechanically coupled to the first lens unit by a first transmission having a first transmission ratio and coupled to the second lens unit by a second transmission have a second transmission ratio. The first and second transmission ratios are such that actuation of the actuator causes the first displacement of the first lens unit from the first position to the second position and the second displacement of the second lens unit from the third position to the forth position.

In some implementations, the optical apparatus further includes a second reflective component configured to reflect light transmitted through the first and second lens units from the optical plane to a second optical axis that lies parallel to the first optical axis.

In some implementations, the respective focal plane is perpendicular to the second optical axis and the optical apparatus further includes an imaging sensor disposed along the second optical axis.

In some implementations, the first reflective component reflects light from the first optical axis to a third optical axis in the optical plane. In some implementations, the optical apparatus further includes a third reflective component configured to reflect light from the third optical axis to a fourth optical axis in the optical plane and a fourth reflective component configured to reflect light from the fourth optical axis to a fifth optical axis in the optical plane. In some implementations, the first lens unit is disposed along the third optical axis and the second lens unit is disposed along the fifth optical axis.

In some implementations, the first reflective component reflects light from the first optical axis to a sixth optical axis in the optical plane. In some implementations, the optical apparatus further includes a fifth reflective component configured to reflect light from the sixth optical axis to a seventh optical axis in the optical plane. In some implementations, the first lens unit is disposed along the sixth optical axis and the second lens unit is disposed along the seventh optical axis.

In some implementations, the apparatus is part of an optical zooming unit integrated into a mobile camera phone. In some implementations, the apparatus is configured to be user-exchangeable.

To address the aforementioned problems, some implementations provide another optical apparatus. The apparatus includes a first reflective component configured to reflect light from a first optical axis to an optical plane substantially perpendicular to the first optical axis. The apparatus further includes, a first lens unit disposed within the optical plane, a second lens unit disposed within the optical plane, an imaging sensor, and an actuator mechanically coupled with the first lens unit to cause a first displacement of the first lens unit from a first position within the optical plane to a second position within the optical plane and mechanically coupled to the imaging sensor to cause a second displacement of the imaging sensor from a first focal plane to a second focal plane. The first and second displacements occur concurrently. The first displacement of the first lens unit is compensated by the second displacement of the imaging sensor such that light transmitted through the first lens unit in the first position and through the second lens unit is imaged with a first magnification at the first focal plane and light transmitted through the first lens unit in the second position and through the second lens unit is imaged with a second magnification different from the first magnification at the second focal plane, thereby effecting an optical zoom effect.

In some implementations, the actuator is mechanically coupled to the first lens unit by a first transmission having a first transmission ratio and coupled to the imaging sensor by a second transmission having a second transmission ratio, the first and second transmission ratios being such that actuation of the actuator causes the first displacement of the first lens unit from the first position to the second position and the second displacement of the imaging sensor from the first focal plane to the second focal plane position.

In some implementations, the optical apparatus further includes a second reflective component configured to reflect light transmitted through the first and second lens units from the optical plane to a second optical axis, wherein the second optical axis lies parallel to the first optical axis.

In some implementations, the first and second focal planes are perpendicular to the second optical axis and the imaging sensor is disposed along the second optical axis.

In some implementations, the first reflective component reflects light from the first optical axis to a third optical axis in the optical plane, and the optical apparatus further includes a third reflective component configured to reflect light from the third optical axis to a fourth optical axis in the optical plane, and a fourth reflective component configured to reflect light from the fourth optical axis to a fifth optical axis in the optical plane.

In some implementations, the first lens unit is disposed along the third optical axis and the second lens unit is disposed along the fifth optical axis.

In some implementations, the first reflective component reflects light from the first optical axis to a sixth optical axis in the optical plane, and the apparatus further includes a fifth reflective component configured to reflect light from the sixth optical axis to a seventh optical axis in the optical plane.

In some implementations, the first lens unit is disposed along the sixth optical axis and the second lens unit is disposed along the seventh optical axis.

In some implementations, the apparatus is part of an optical zooming unit integrated into a mobile camera phone. In some implementations, the apparatus is configured to be user-exchangeable.

To address the aforementioned problems, some implementations provide a portable multifunction device. The portable multifunction device includes a cellular telephone with a display and a detachable optical zooming unit. The detachable optical zooming unit includes a first lens unit that defines an optical axis of light entering the optical zooming unit, and a second lens unit configured to move in a plane substantially perpendicular to the optical axis. Movement of the second lens unit effects a change in a focal length of detachable optical zooming unit.

In some implementations, the optical zooming unit further includes a third lens unit configured move in such a way as to compensate for the change in the focal length, such that an object imaged by the portable multifunction device is imaged at a fixed focal plane regardless of the movement of second lens unit.

BRIEF DESCRIPTION OF THE DRAWINGS

For a better understanding, reference should be made to the following detailed description taken in conjunction with the accompanying drawings, in which:

FIG. 3 illustrates a three-dimensional perspective drawing of an optical zooming unit, in accordance with some implementations.

FIG. 4A illustrates a four lens unit design for optical zooming along an optical axis, in accordance with some implementations.

FIGS. 13A-13D illustrate mechanisms for realizing various relative movements between the zooming lens unit and the compensation lens unit, in accordance with some implementations.

FIGS. 15A-15B illustrate another mechanism for magnifying movement from a cam gear, in accordance with some implementations.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

To achieve optical zooming in a compact space (e.g., in a smart/cellular phone camera or other miniature imaging device), some implementations described herein provide a structure having a focal length that can be continuously adjusted within a predefined zoom range by actuating lens motion in a direction perpendicular to an optical axis of an entrance ray. In contrast to traditional optical zooming units, some implementations of the present disclosure introduce an approach that integrates optical components and opto-mechanical components into a single modular housing, distinct from the phone housing, providing a greater degree of compatibility with existing smart/cellular phone designs. For example, in some circumstances, a phone manufacture could specify a set of dimensions allotted to camera optics in their existing cellular phone design, and a provider of the optical zooming units described herein could design an optical zooming unit with a modular housing such that very few, if any, changes would be required to the existing cellular phone design.

Some implementations of the present disclosure also provide exchangeable zooming units which allow, for example, a user of a smart/cellular phone camera to switch between optical zooming units with differing predefined zoom ranges, further increasing range over which optical zooming can be performed with the same smart/cellular phone camera (or other imaging device).

Figure 1:
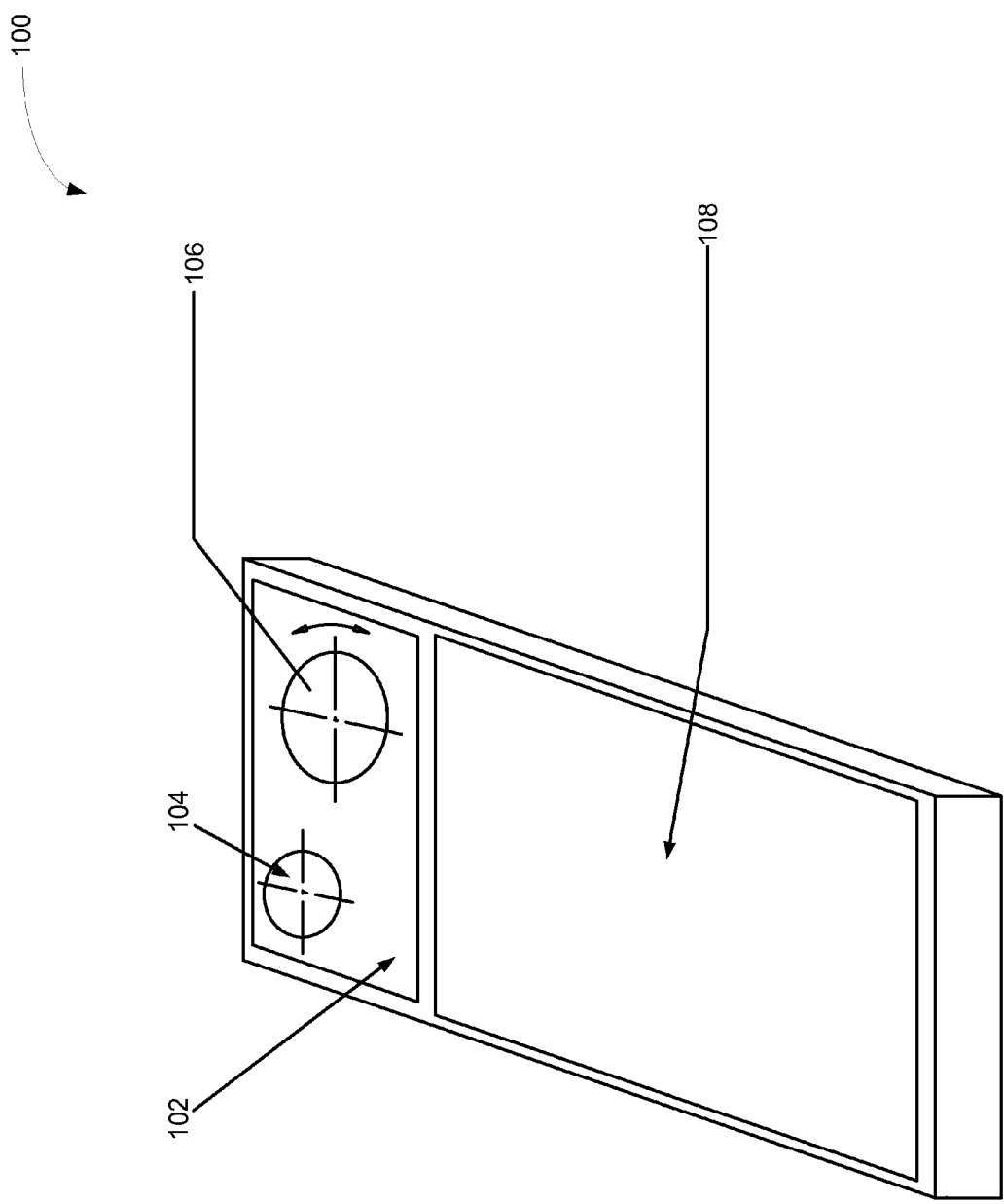
FIG. 1 illustrates a device having a fixed (e.g., non-exchangeable) optical zooming unit, in accordance with some implementations.

FIG. 1 illustrates a device 100 having an optical zooming unit 102, in accordance with some implementations. In some implementations, the optical zooming unit 102 has a focal length that can be continuously adjusted within a predefined zoom range. For example, some implementations provide an optical zooming unit with a 3× optical zoom (e.g., with a focal length ranging from 9 mm to 27 mm) Alternatively, some implementations provide an optical zooming unit with a 5× optical zoom (e.g., with a focal length ranging from 6 mm to 30 mm) It should be understood, however, that different focal lengths and variable zoom ranges can be accommodated (e.g., other than the examples provided).

In some implementations, the optical zooming unit 102 is embedded within the housing of the device 100, and is thereby invisible to user. Alternatively, in some implementations, the optical zooming unit 102 is configured to be inserted into position from a top or from a side of the device 100 by a user. In some implementations, the optical zooming unit 102 is mounted to a front side of the device 100 or, alternatively, a back side of the device 100 (e.g., depending on design requirements of the device 100). The optical zooming unit 102 includes a light entrance window 104 through which entrance rays (e.g., entering light) enter the optical zooming unit 102. The light entrance window 104 defines an entrance optical axis along which the entrance rays enter. For example, in some implementations, the optical axis is an axis along which there is some degree of rotational symmetry of the light entrance window 104 (e.g., the optical axis is perpendicular to the light entrance window 104 about its geometrical center). The optical zooming unit 102 also includes a zooming wheel 106 by which a user adjusts the focal length of the optical zooming unit 102 within the predefined zoom range, thereby realizing the optical zooming. In some implementations, the zooming wheel 106 is replaced by a stepper motor. In some implementations, the optical zooming is realized through automatic or programmable actuation of the stepper motor. For example, in some implementations, the device 100 includes a touch screen display that displays a preview image of the camera's field of view. In some implementations, a user can "pinch-to-zoom" by performing a predefined touch gesture on the touch screen display. In some implementations, the device 100 interprets the gesture through software and actuates the stepper motor accordingly to realize optical zooming. In some implementations, actuation of the stepper motor is accomplished through mechanical means. For example, the device 100 includes a scroll wheel that is coupled with a potentiometer. In this example, the stepper motor positions one or more opto-mechanical components in accordance with a voltage across the potentiometer. It should be understood that any of the implementations described herein may utilize hardware, software, mechanical elements, or a combination thereof, in order to actuate the motion of opto-mechanical components described herein.

The device 100 further includes a cellular device functional area 108 (e.g., the touch screen display) through which the user can perform device operations, such as placing telephone calls and acquiring pictures through, for example, a camera application stored in memory on the device 100.

Figure 2:
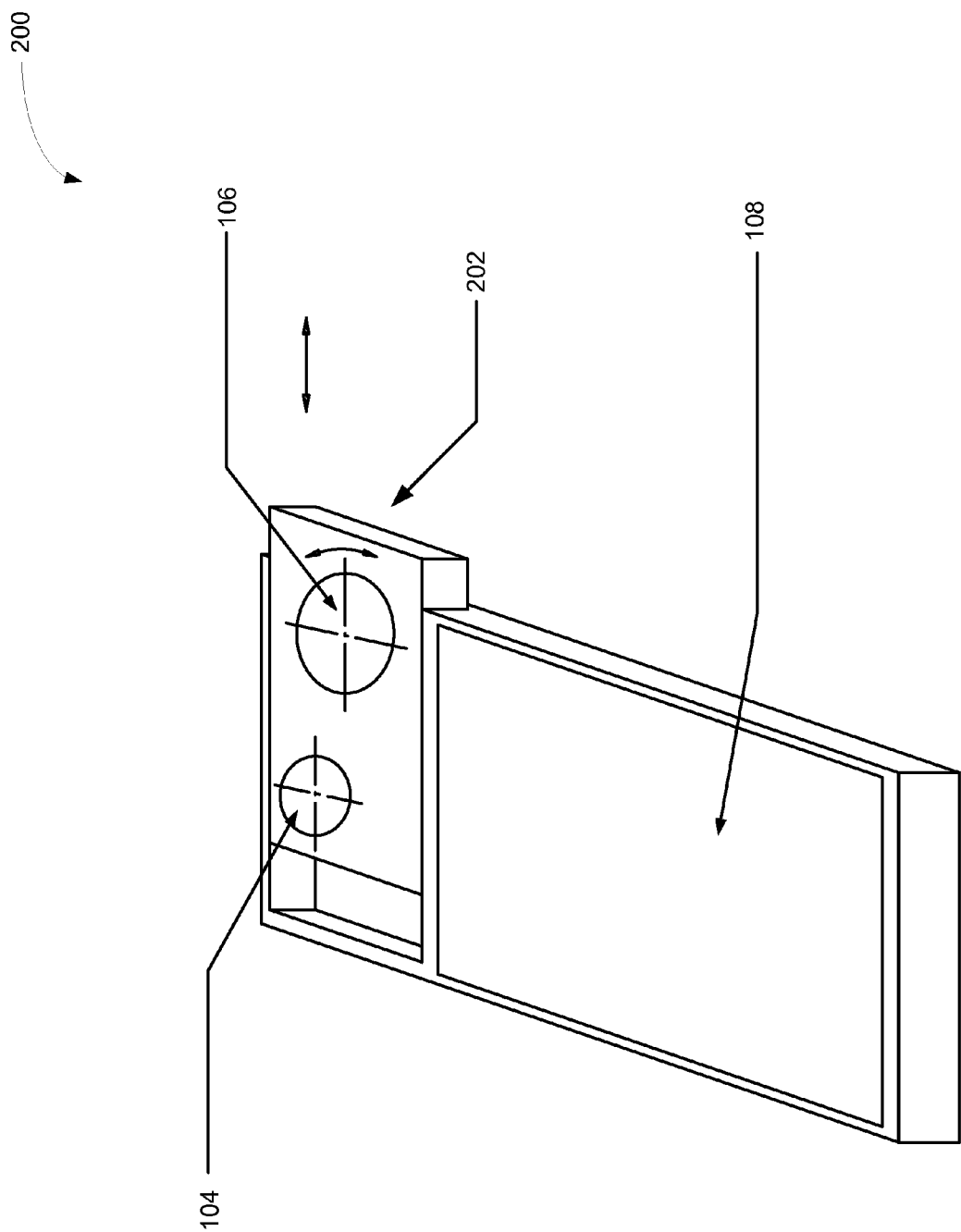
FIG. 2 illustrates a device having an exchangeable optical zooming unit, in accordance with some implementations.

FIG. 2 illustrates a device 200 having an exchangeable modular optical zooming unit 202, in accordance with some implementations. Due to the restriction of available space and the limitations on the optical design and opto-mechanical structure, the predefined zoom range of the optical zooming unit 102 (FIG. 1) is limited. To achieve a larger zoom range and thus allow for a wider range of imaging applications, the device 200 provides an exchangeable platform. For example, a provider of the optical zooming units described herein could sells sets of optical zooming units with contiguous or slightly overlapping zoom ranges. A set could include an optical zooming unit with a variable focal length between 6 mm and 18 mm, an optical zooming unit with a variable focal length between 16 mm and 35 mm, and an optical zooming unit with a variable focal length between 30 mm and 60 mm, thereby providing an effective optical zooming range of 6 mm to 60 mm, or a 10× optical zoom.

In some implementations, the optical zooming unit 202 is configured to be inserted into the device 200 from one side (e.g., either a left side or a right side) of the device 200. Alternatively, the optical zooming unit 202 is configured to be inserted into the device 200 from a top surface of the device 200. In addition to providing a manner in which to extend the optical zooming range of the device 200, the exchangeable nature of the optical zooming unit 202 allows the optical zooming unit 202 to be application specific. For example, a respective optical zooming unit 202 may be intended for nature photography or may have a high numerical aperture for photography in low-light conditions.

FIG. 3 illustrates a three-dimensional perspective drawing of the optical zooming unit 102/202 (e.g., either the optical zooming unit 102 or the optical zooming unit 202), in accordance with some implementations. In some implementations, the device includes a front lens set 302 that includes one or more entrance lens(es) mounted outside of the optical zooming unit 102/202 (e.g., on a device housing, not shown). The device 100/200 further includes a back lens set 304 that includes one or more back lens(es) mounted outside of the optical zooming unit 102/202 (e.g., on the device housing, not shown). In some implementations, the entrance and exit rays are parallel (e.g., along the direction of the optical axis of the entrance rays). Optical zooming is realized by actuating motion of one or more mechanical zoom part(s) 306 within the optical zooming unit 102/202, as described in greater detail below.

In some implementations, light exits the optical zoom unit 102/202 through an exit window and is impinges upon the exit lens set 304 and subsequently upon an imaging sensor 308 that is mechanically separate from the optical zooming unit 102/202 (e.g., a detector that is mounted on a housing of the device 100/200). The imaging sensor 306 has a fixed position such that the mechanical zoom parts 306 within the optical zooming unit 102/202 are not apparent from outside of the housing and have no impact on other components of the device 100/200. In some implementations, one or more auxiliary imaging sensor(s) (e.g. auto-focus or controlling parts) are integrated in the optical zooming unit 102/202 or, alternatively, are integrated outside of the optical zooming unit 102/202.

As shown in FIG. 3, light is directed along an optical axis 310 that is folded from an initial optical axis defined by the entrance rays into an optical plane substantially perpendicular to the initial optical axis.

FIG. 4A illustrates a four lens unit design 400 for optical zooming along an optical axis η. It should be appreciated that, although η is shown lying along a single direction, the optical axis may change directions, for example, when light transmitted along the optical axis is reflect by a mirror. In some implementations, the four lens unit design 400 includes a lens unit 402 called a front lens unit, a lens unit 404 called a zooming lens unit, a lens unit 406 called a compensation lens unit, and a lens unit 408 called a back lens unit. In some implementations, one or more of the lens units 402, 404, 406 and 408 consist of a single lens. Alternatively, one or more of the lens units 402, 404, 406 and 408 include multiple lenses (e.g., for aberration reduction and other image quality enhancements). Optical zooming is achieved by relative movement among lens units 402, 404 and 408, while the lens unit 406 moves to compensate shifts in a focal plane position due to the relative movements of the lens units 402, 404, and 408. In particular, the compensation lens unit 406 moves such that the imaging plane remains at a fixed focal plane 412 (e.g., a position of the imaging sensor 308, FIG. 3).

Optical zooming along the optical axis η is now described mathematically for the four lens unit design 400. Let the distance between an object and a focal plane of the optical zooming unit 102/202 be initially equal to $L_1$ when the zooming lens unit 404 is at an initial zooming lens unit position and the compensation lens unit 406 is at an initial compensation lens unit position. After translation of the zooming lens unit 404 to a final zooming lens unit position and translation of the compensation lens unit 406 to a final compensation lens unit position, the distance between the object and the focal plane of the optical zooming unit 102/202 becomes $L_2$. In some implementations, the location of the imaging sensor is fixed (e.g., on the device housing), so the focal plane is required to remain at a fixed position. The condition that the focal plane remains at a fixed position means that $L_1-L_2=0$, which may be expressed as:

$$f'_c\left(\frac{1}{M'_c} + M'_c - \frac{1}{M_c} - M_c\right) + f'_b\left(\frac{1}{M'_b} + M'_b - \frac{1}{M_b} - M_b\right) = 0 \quad (1)$$

where $f'_b$ and $f'_c$ are the focal lengths of the zooming lens unit 404 and the compensation lens unit 406, respectively; $M_b$ and $M'_b$ are the magnifications of the zooming lens unit 404 at the initial zooming lens unit position and final zooming lens unit position, respectively; and $M_c$ and $M'_c$ are the magnifications of the compensation lens unit 406 at an initial compensation lens unit position and a final compensation lens unit position, respectively.

During the zooming movement, a displacement of the zooming lens unit 404 is $\Delta\eta_z$, which is the difference between the final zooming lens unit position and the initial zooming lens unit position. The displacement of the zooming lens unit 404 is given by the formula:

$$\Delta\eta_z = f'_b\left(\frac{1}{M'_b} - \frac{1}{M_b}\right) \quad (2)$$

Likewise, a displacement of the compensation unit 406 is $\Delta\eta_c$, which is the difference between the final compensation lens unit position and the initial compensation lens unit position. The displacement of the compensation lens unit 406 is given by the formula:

$$\Delta\eta_c = f'_c(M'_c - M_c) \quad (3)$$

In some implementations, the following constraint conditions exist for four lens unit design, including: (A) the zooming lens unit 404 cannot collide with the compensation lens unit 406, and (B) neither the zooming lens unit 404 nor compensation the lens unit 406 can collide with any mirrors along the optical axis. Conditions (A) and (B), as well as one or more design requirements for imaging performance, constitute a set of conditions and design parameters for the design of the optical zoom unit 102/202.

Conventional optical zooming is performed along an optical axis that lies along a single direction defined by the entrance axis of the light (herein defined without loss of generality as the z-direction). This is not suitable in smart/cellular phone cameras or other miniature imaging device because of the aforementioned spatial design restraints. The present disclosure provides optical zooming apparatus implementations that reflect imaging rays from z-direction into the x-y plane (where x-, and y- are orthogonal directions to the z-direction in a standard Cartesian coordinate system), thereby producing a folded optical axis. Opto-mechanical components and optical lenses/mirrors are integrated along the folded optical axis 310 in a compact way in a single optical zooming unit (e.g., the optical zooming unit 102/202).

Figure 4B:
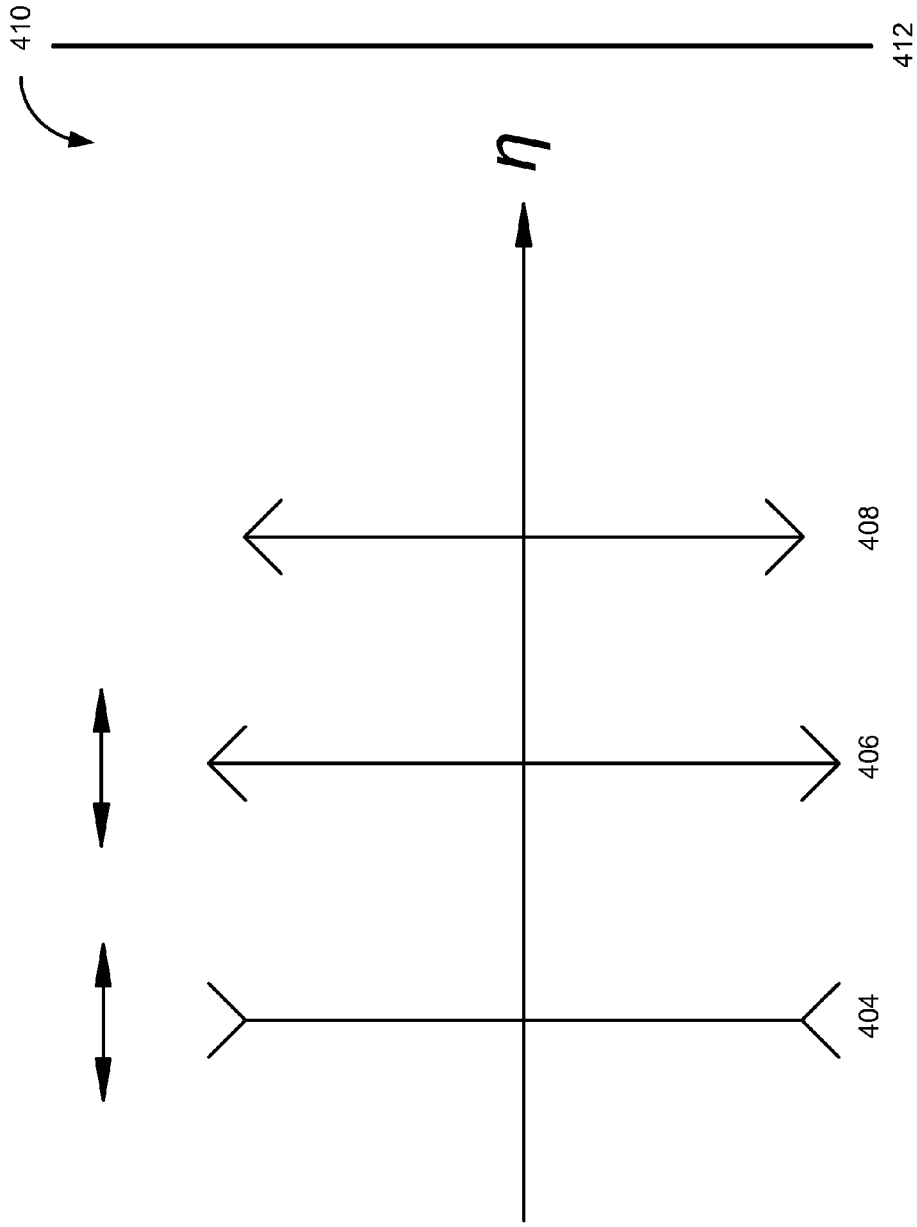
FIG. 4B illustrates a three lens unit design for optical zooming along an optical axis, in accordance with some implementations.

FIG. 4B is analogous to FIG. 4A with the difference that FIG. 4B illustrates a three lens unit design 410 for optical zooming along an optical path length η, in accordance with some implementations. Equations (1), (2), and (3) remain valid for the three lens unit design 410. The three lens unit design 410 is otherwise analogous to the four lens unit design 400, except that the three lens unit design 410 does not include a front lens unit 402.

Figure 5:
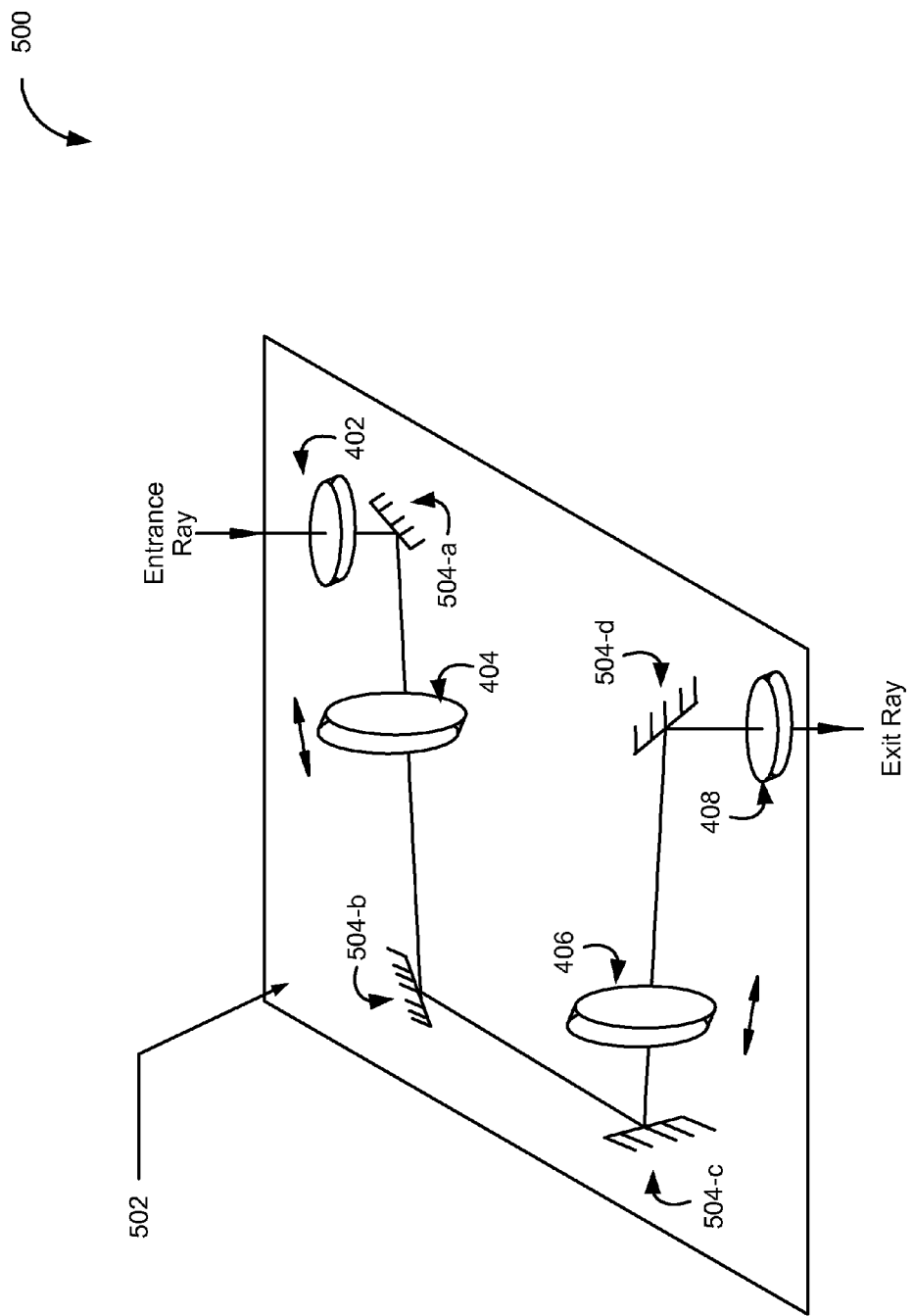
FIG. 5 shows an optical layout of a four lens unit design, in accordance with some implementations.

FIG. 5 shows an optical layout 500 of a four lens unit design (e.g., the four lens unit design 400), in accordance with some implementations. Optical components of the optical layout 500 are mounted on an optical surface 502. The optical layout 500 includes the front lens unit 402 and the back lens unit 408. In some implementations, the front lens unit 402 and the back lens unit 408 are outside of an active zooming region (e.g., a region in which the optical axis lies in the x-y plane). Such a layout has the benefit that it provides extra room in the active zooming region for movement of opto-mechanical components, effectively allowing the predefined zoom range to be greater. In some implementations, the front lens unit 402 and the back lens unit 408 are outside of the optical zooming apparatus (e.g., outside of the optical zooming unit 102/202).

The optical layout 500 includes reflective components 504 (e.g., 504-a, 504-b, 504-c, 504-d). In some implementations, the reflective component 504-c is optional and may be included to increase the spacing between the lens unit 404 and the lens unit 406. In some implementations, the reflective components 504 comprise any optical component capable of altering the direction of the optical axis. In some implementations, one or more of the reflective components 504 are mirrors. In some implementations, one or more of the reflective components 504 are prisms. In some implementations, one or more of the reflective components 504 are attached to an optical rail, as described below with reference to FIG. 9. The zooming lens unit 404 and the compensation lens unit 406 are mounted on, and move along, the optical rail. In some implementations, the zooming lens unit 404 and the compensation lens unit 406 move along the same direction. In some implementations, the zooming lens unit 404 and the compensation lens unit 406 move along different direction (e.g., opposite directions). The reflective component 504-a converts entering rays from the z-direction to the x-y plane. The reflective component 504-d converts an exit rays back into the z-direction before the exit rays impinge the back lens unit 408 and the imaging sensor (not shown).

Figure 6:
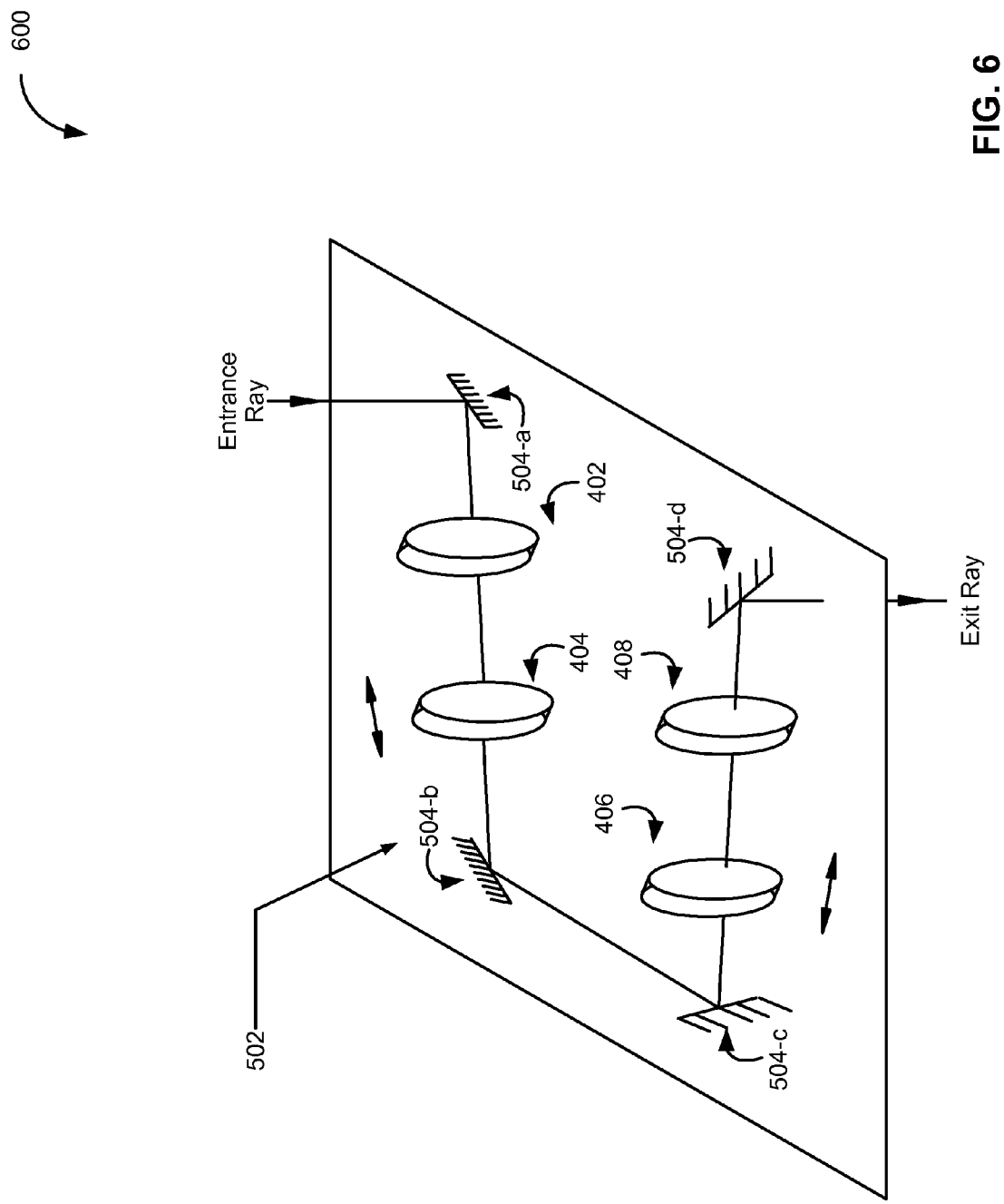
FIG. 6 shows optical layout of another four lens unit design, in accordance with some implementations.

FIG. 6 shows an optical layout 600 of a four lens unit design (e.g., the four lens unit design 400), in accordance with some implementations. The optical layout 600 is analogous to the optical layout 500 (shown in FIG. 5), except that in the optical layout 600, the front lens unit 404 and the back lens unit 408 are within the zooming path (e.g., between the reflective component 504-a and the reflective component 504-d), which has the benefit that it reduces the necessary dimensional size of the apparatus in the z-direction, and therefore allows for a more compact arrangement of optical components.

Figure 7:
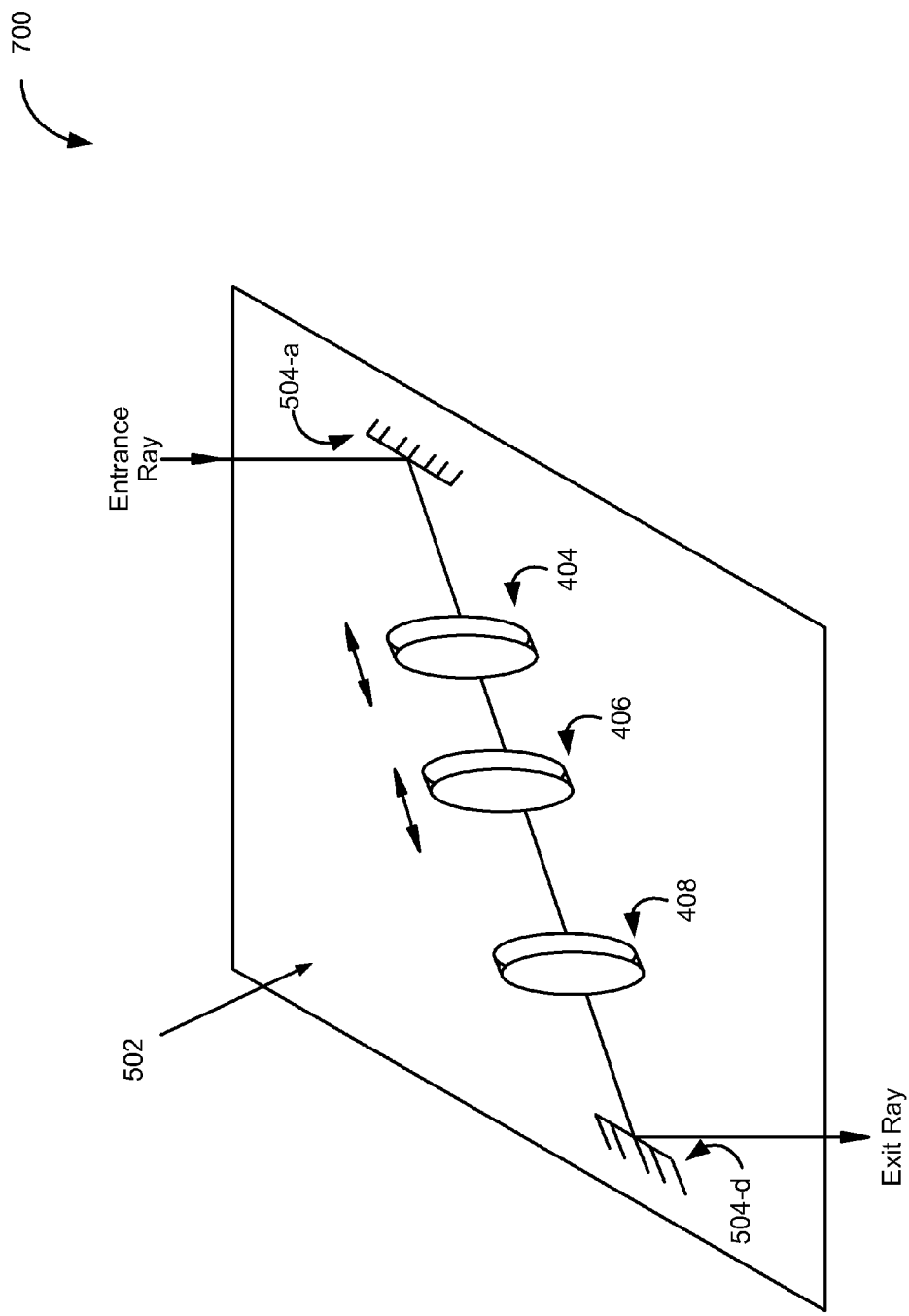
FIG. 7 shows an optical layout of a three lens unit design, in accordance with some implementations.

FIG. 7 shows an optical layout 700 of a three lens unit design (e.g., the three lens unit design 410), in accordance with some implementations. In some implementations, the front lens unit 402 is eliminated (as shown in the optical layout 700). In such implementations, the dimensional size of the optical zooming apparatus 700 can be minimized in one or more directions. Similarly, although not shown, in some implementations the back lens unit 408 is eliminated and the dimensional size of the optical zooming apparatus 700 can be minimized in one or more directions.

Figure 8:
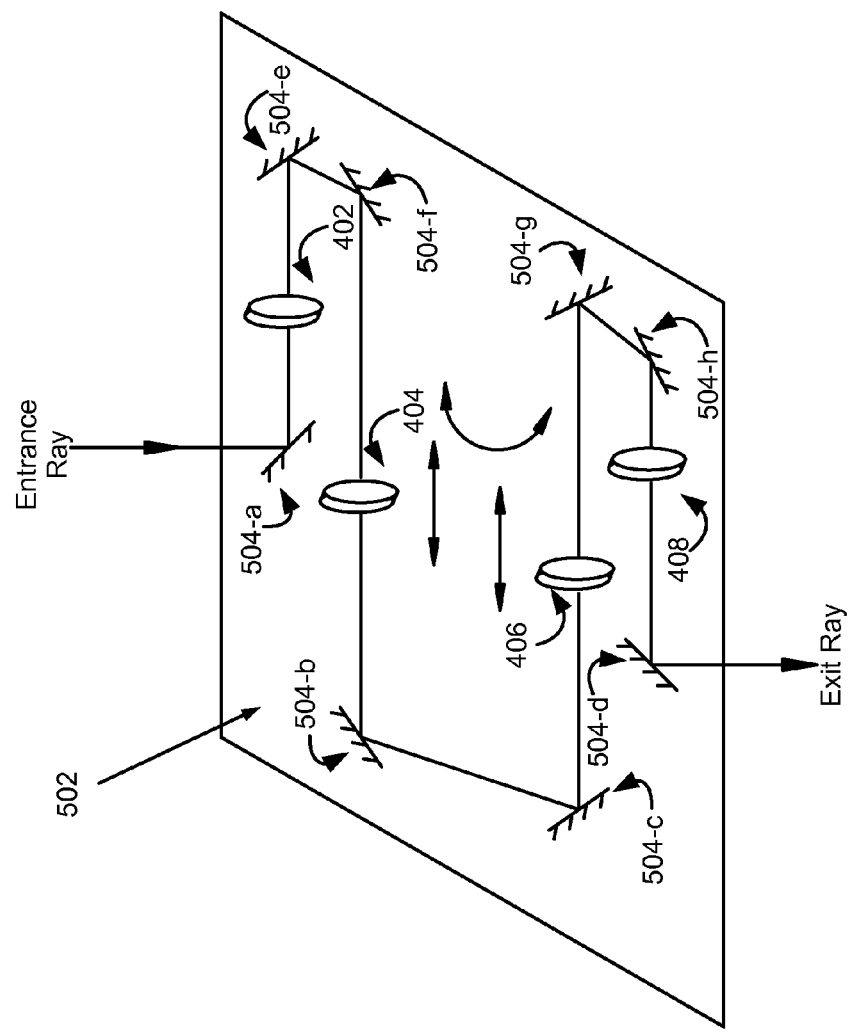
FIG. 8 shows optical layout of another four lens unit design, in accordance with some implementations.

FIG. 8 shows an optical layout 800 of a four lens unit design (e.g., the four lens unit design 400), in accordance with some implementations. To increase the zooming range, a longer displacement of the zooming lens unit 404 is generally needed, which necessitates a longer displacement of the compensation lens unit 406. In the optical layout 800, the front lens unit 402 is separated from the zooming lens unit 404 by the reflective components 504-e and 504-f, which serve to fold the optical axis substantially back along itself. For example, in various implementations, reflective components 504-e and 504-f fold the optical axis by a value greater than 90 degrees, or by a value greater than 120 degrees, or by a value greater than 170 degrees, or by a value substantially equal to 180 degrees. Likewise, the back lens unit 408 is separated from the compensation lens unit 406 by the reflective components 504-g and 504-d, which serve to fold the optical axis substantially back along itself (e.g., fold the optical axis by a value greater than 90 degrees, or greater than 120 degrees, or greater than 170 degrees, or substantially equal to 180 degrees). The reflective components 504-e, 504-f, 504-g, and 504-h serve to make more effective use of the area of the optical surface 502 such that the relative positions of the zooming lens unit 404 and the compensation lens unit 406 can have longer respective displacements and thus extended the predefined zooming range while still meeting the aforementioned constraints (A) and (B).

As noted above, in some implementations, any of the lens units 402, 404, 406, and 408 may include multiple lenses. In some implementations, each of the lens units 402, 404, 406, and 408 respectively moves as a single unit. The circular arrow between the lens units 404 and 406 represents the mechanical tuning system, which controls the movement of at least the lens units 404 and 406 and therefore the optical zooming.

Figure 9:
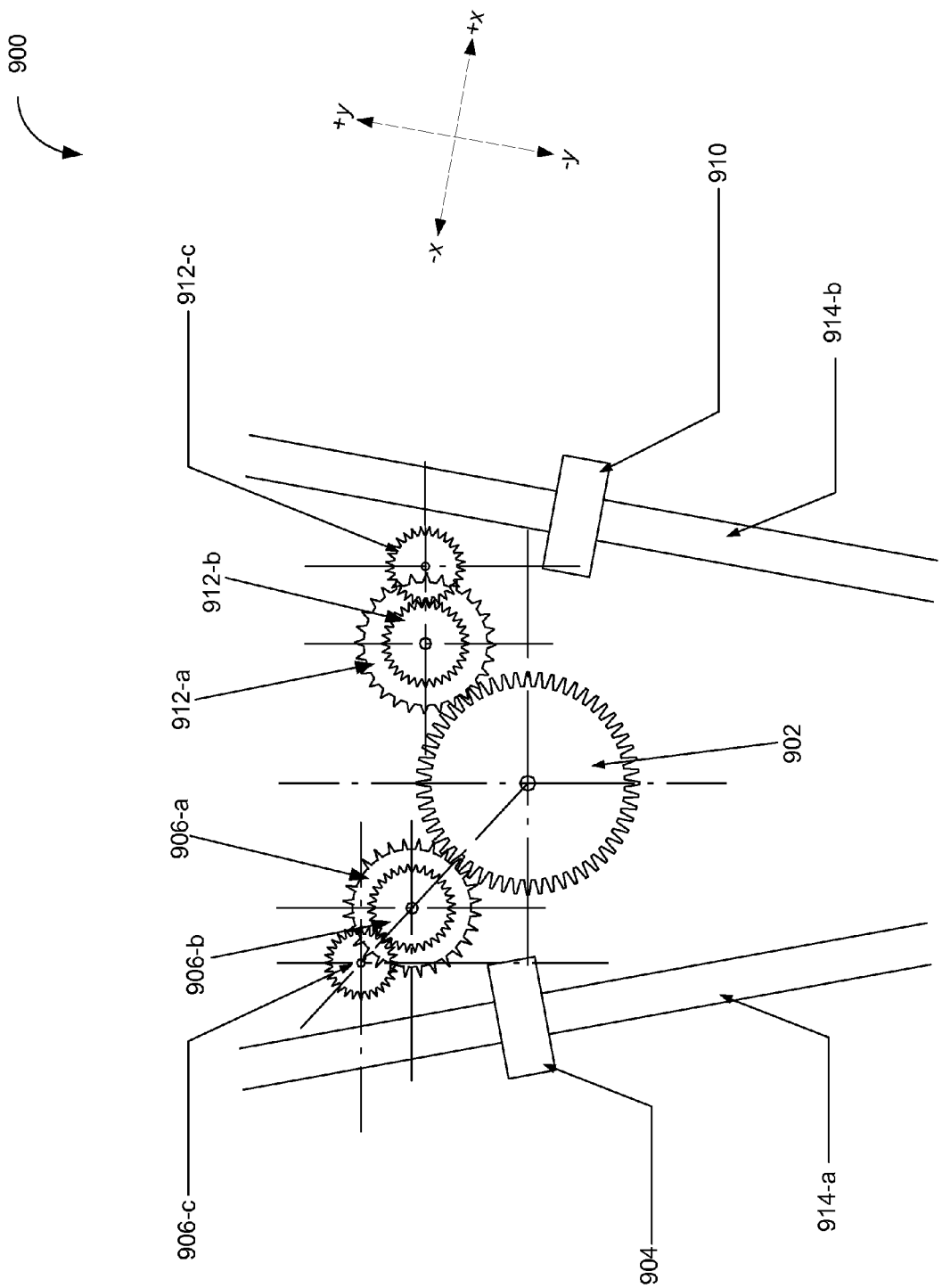
FIG. 9 is a schematic top view of an example optical zooming apparatus for use in an optical zooming unit, in accordance with some implementations.

FIG. 9 is a schematic top view of an example optical zooming apparatus 900 for use in an optical zooming unit (e.g., the optical zooming unit 100/200), in accordance with some implementations.

The optical zooming apparatus 900 includes a gear set 902. In some implementations, the gear set 902 consists of a single gear. In some implementations, the gear set 902 includes a plurality of gears. For example, in some implementations, the gear set 902 includes one or more gears corresponding to the zooming lens unit 404 and one or more gears corresponding to the compensation lens unit 406. Regardless, the gear set 902 is mechanically coupled with an actuator (e.g., the zooming wheel 106 or a stepper motor) that allows the user to adjust the optical zoom within the predefined range. The gear set 902 is further coupled with a zooming lens moving unit 904 through one or more first gears 906 (e.g., gears 906-a, 906-b, and 906-c), thus coupling the actuator to the zooming lens moving unit 904 through a first transmission (e.g., the gear set 902 and the first gears 906) having a first transmission ratio (e.g., gear ratio) corresponding to the gear set 902 and the first gears 906. The zooming lens moving unit 904 mechanically supports the zooming lens unit 404 (FIG. 4). For example, the respective lenses comprising the zooming lens unit 404 are mounted on the zooming lens moving unit 904.

Similarly, the gear set 902 is also coupled with a compensation lens moving unit 910 through one or more second gears 912 (e.g., gears 912-a, 912-b, and 912-c), thus coupling the actuator to the compensation lens moving unit 910 through a second transmission (e.g., the gear set 902 and the second gears 912) having a second transmission ratio (e.g., gear ratio) corresponding to the gear set 902 and the second gears 912. The compensation lens moving unit 910 mechanically supports the compensation lens unit 406 (not shown). For example, the respective lenses comprising the compensation lens unit 406 are mounted on zooming lens moving unit 910.

In some implementations, the zoom lens moving unit 904 is mounted on a first lens guide rail 914-a. A respective gear (e.g., gear 906-c) of the first gears 906 engages the zooming lens moving unit 904 so as to convert rotational movement of the actuator into translational movement of the zooming lens moving unit 904 causing displacement of the zooming lens unit 404 given by equation (2). The engagement of the respective gear of the first gears with the zooming lens moving unit 904 is not shown in FIG. 9, but is described in greater detail with reference to FIG. 11 and FIG. 12.

Likewise, the compensation lens moving unit 910 is mounted on a second lens guide rail 914-b. A respective gear (e.g., gear 912-c) of the second gears engages the compensation lens moving unit 910 such as to convert the rotational movement of the actuator into translational movement of the compensation lens moving unit 910 causing displacement of the compensation lens unit 406 given by equation (3). The engagement of the respective gear of the second gears with the compensation lens moving unit 910 is not shown in FIG. 9, but is described in greater detail with reference to FIG. 11 and FIG. 12.

Stated another way, the first and second transmission ratios are selected (e.g., the first and second transmissions are designed, respectively) such that actuation of the actuator causes the zooming lens unit 404 to be displaced by a first amount and the compensation lens unit 406 to be displaced by an second amount, where the displacement of the zooming lens unit 404 by the first amount and the displacement of the compensation lens unit 406 by the second amount causes the location of the focal plane to remain unchanged.

In some implementations, the zooming lens moving unit 904 and the compensation lens moving unit 910 move in substantially the same direction (e.g. when the zooming lens moving unit 904 moves substantially in the +y direction, the compensation lens moving unit 910 moves substantially in the +y direction). In some implementations, the zooming lens moving unit 904 and the compensation lens moving unit 910 move in substantially opposite directions (e.g. when the zooming lens moving unit 904 moves substantially in the +y direction, the compensation lens moving unit 910 moves substantially in the −y direction).

Figure 10:
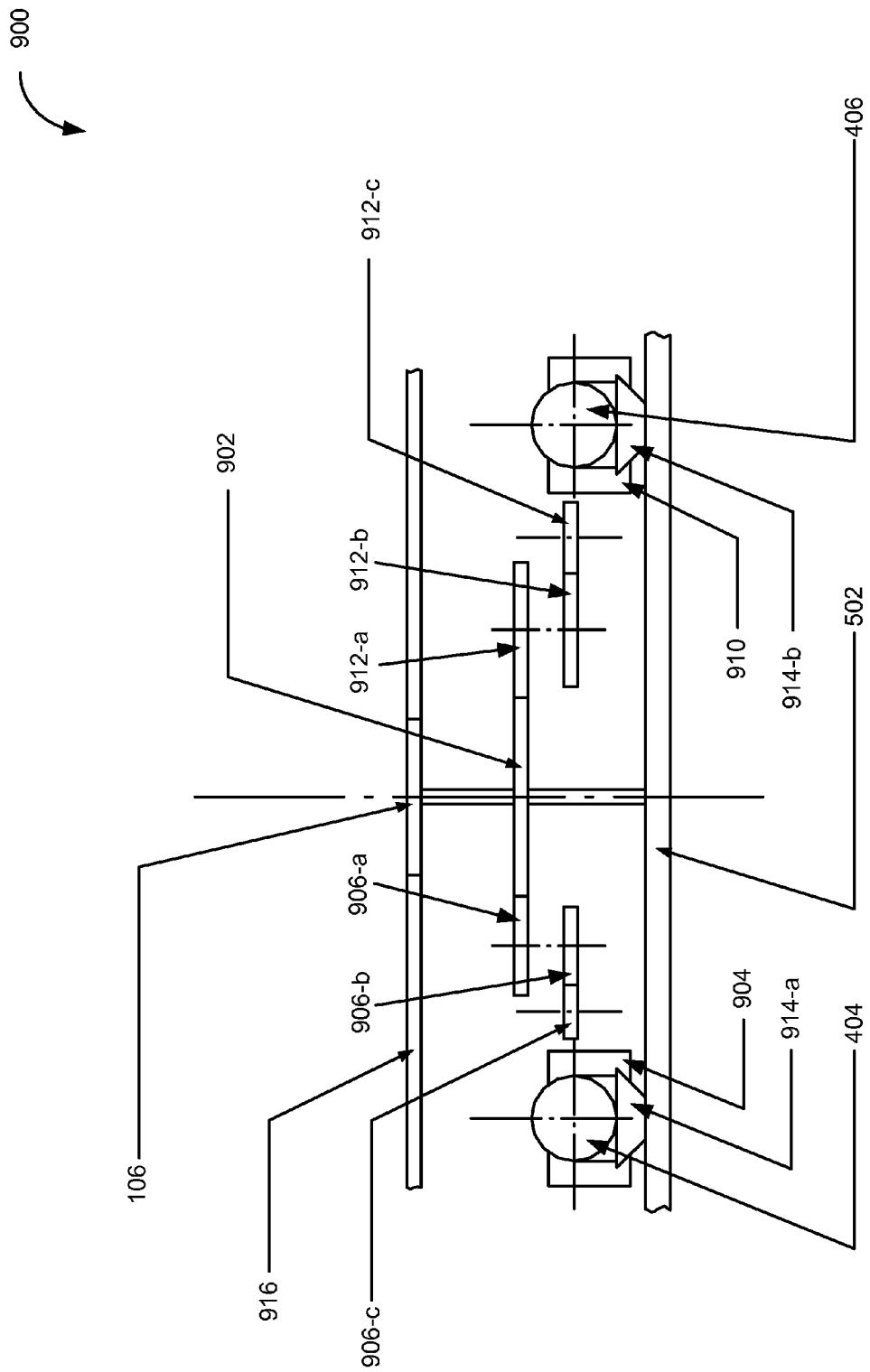
FIG. 10 is a schematic side view of the example optical zooming apparatus of FIG. 9 for use in an optical zooming unit, in accordance with some implementations.

FIG. 10 is a schematic side view of the example optical zooming apparatus 900 for use in an optical zooming unit (e.g., the optical zooming unit 100/200), in accordance with some implementations. The lens guide rails 914 and the first and second transmissions are anchored to the optical surface 502. The device is housed within a housing 916 of the optical zoom unit 100/200. FIG. 10 also illustrates the relative position of the zooming lens unit 404 with respect to the zooming lens moving unit 904, in accordance with some implementations, and the relative position of the compensation lens unit 406 with respect to the compensation lens moving unit 910, in accordance with some implementations.

While the example optical zooming apparatus 900 has been described in order to provide one implementation of a mechanical system (or part of a system) for actuating motion of opto-mechanical components (e.g., compensation lens moving unit 910), other ways of actuating motion of opto-mechanical components will be apparent to those of ordinary skill in the art.

Figure 11:
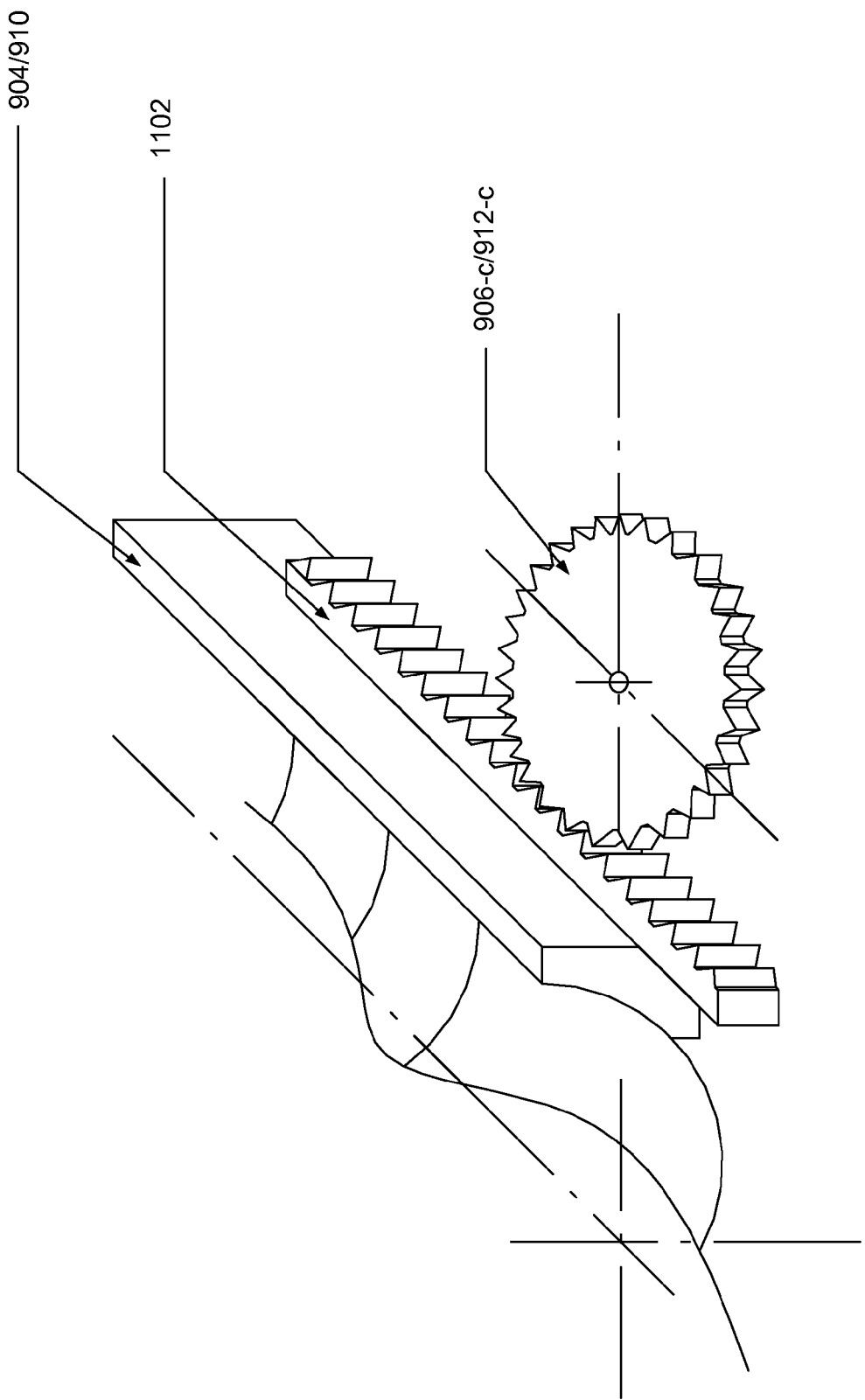
FIG. 11 is a perspective view of an example mechanical engagement between a transmission and a lens unit, in accordance with some implementations.

FIG. 11 is a perspective view of an example mechanical engagement between a respective gear of the first or second gears (e.g., 906-c/912-c) with the zooming lens unit 904 or the compensation lens moving unit 910, respectively. In some implementations, the respective gear is coupled to the corresponding lens moving unit via a straight gear 1102, which converts the rotational movement to translational movement, as described above. In some implementations, the straight gear 1102 is mounted on the corresponding lens moving unit, which is only partially drawn. This type of engagement is sometimes referred to as "linear movement," because the corresponding lens moving unit moves linearly with angular displacement of the zoom wheel (or stepper motor). This type of engagement simplifies the mechanical design of the transmission systems.

Figure 12:
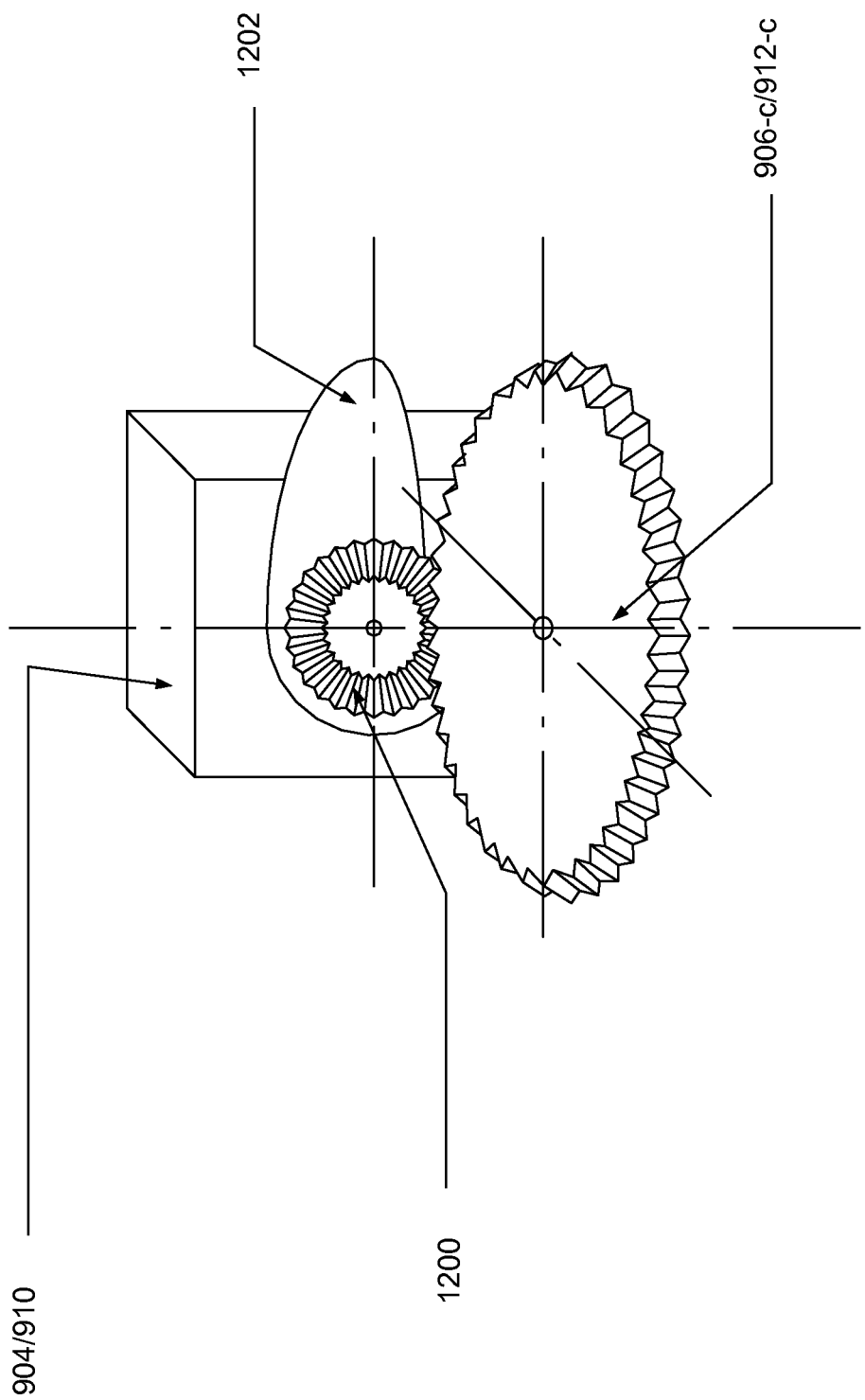
FIG. 12 is a perspective view of another example mechanical engagement between a transmission and a lens unit, in accordance with some implementations.

FIG. 12 is a perspective view of another example mechanical engagement between a respective gear of the first or second gears (e.g., 906-c/912-c) with the zooming lens unit 904 or the compensation lens moving unit 910, respectively. In some implementations, as shown, the respective gear is a cam gear 1202 that includes a bevel gear 1200. The respective gear is coupled to the corresponding lens moving unit via the bevel gear 1200 of the corresponding lens moving unit, which converts the rotational movement to translational movement by means of the cam gear 1202 interacting with a mechanical stop attached or integrated into the lens rail guide 914. When the bevel gear 1200 rotates, the cam gear 1202 rotates as well. The corresponding lens moving unit moves along the lens guide rail 914 by via a mechanical stop moving along the track. This type of engagement is sometimes referred to as "non-linear movement," because the corresponding lens moving unit moves non-linearly with angular displacement of the zoom wheel (or stepper motor). As described below, this types of engagement allows for a greater degree of design flexibility. For example, non-linear movement through a cam mechanism can be amplified as explained with reference to FIGS. 14 and 15.

FIG. 13A is a schematic drawing of relative movement between the zooming lens moving unit 904 and the compensation lens moving unit 910. As shown, the relative movement can be either in substantially the same direction (1300-a) or in substantially opposite directions (1300-b), depending on design requirements. FIG. 13A also shows a right-handed coordinate system for reference to FIGS. 13B-13D (i.e., the coordinate system includes a z-axis, not shown, with the +z-direction "out of the page" in accordance with a right hand rule).

FIGS. 13B-13D illustrate various mechanisms for realizing relative movements between the zooming lens moving unit 904 and the compensation lens moving unit 910, as illustrates schematically in FIG. 13A. FIGS. 13B-13D also show the right-handed coordinate system for reference with FIG. 13A. FIGS. 13B-13D illustrate a bevel gear 1302 attached to a respective one of the zooming lens moving unit 904 or the compensation lens moving unit 910. In some implementations, the bevel gear 1302 includes the cam gear 1202, described with reference to FIG. 12.

FIG. 13B illustrates a mechanism 1304 for moving a lens moving unit in a respective direction given a direction of rotation of the respective gear 906-c/912-c. FIG. 13C illustrates a mechanism 1306 for moving a lens moving unit in an opposite respective direction given the direction of rotation of the respective gear 906-c/912-c. Consider, as an example, an implementation in which the bevel gear 1302 is attached to the compensation lens moving unit 910. When the mechanism 1304 is used, actuation of the zooming wheel 106 in a respective direction will cause a first relative movement between the zooming lens moving unit 904 and the compensation lens moving unit 910. When the mechanism 1306 is used, actuation of the zooming wheel 106 in the respective direction will cause a second relative movement that is substantially opposite the first relative movement (assuming other transmission components remain fixed). FIG. 13D shows an example of the transmission mechanism 1308 between the gear set 902 and a respective gear 906/912, wherein the gear set 902 and the respective gear 906/912 are bevel gears.

Figure 14A:
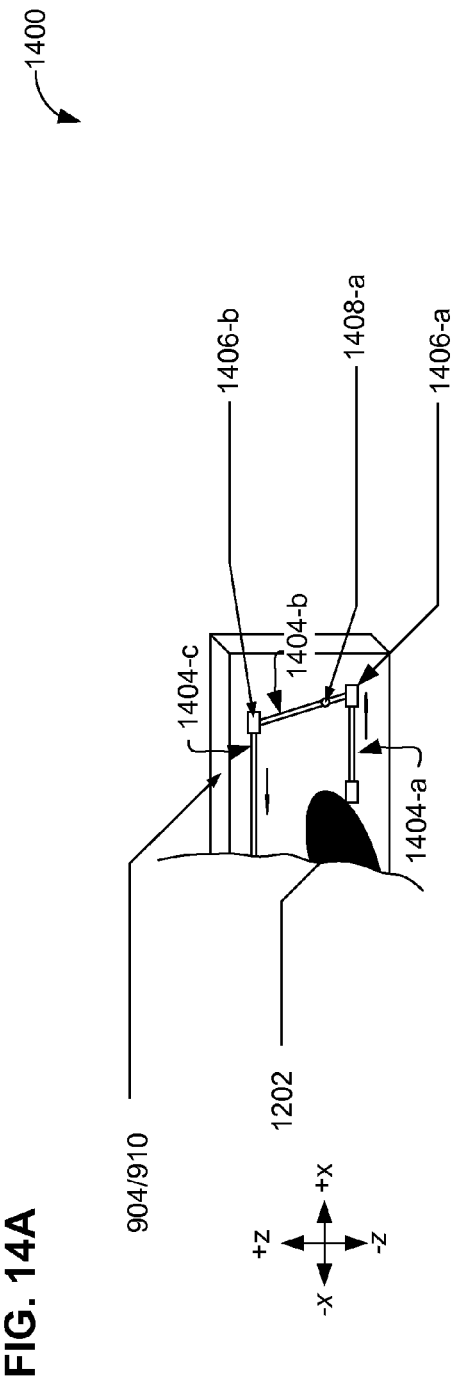
FIGS. 14A-14B illustrate various mechanisms for magnifying movement from a cam gear, in accordance with some implementations.

FIG. 14A illustrates a mechanism 1400 for magnifying movement from the cam gear 1202. When the cam gear 1202 rotates, it pushes a sliding rod 1404-a. Translational movement of the sliding rod 1404-a is transferred to a sliding rod 1404-b by a hinge joint 1406-a and transferred to a sliding rod 1404-c by a hinge joint 1406-b. The translational movement of the sliding rod 1404-a is magnified into the translational movement of the sliding rod 1404-c in accordance with a leverage ratio provided by a leverage supporting point 1408-a. By adjusting a position of the leverage supporting point 1408-a, the leverage ratio and thus the magnification of the translational movement of the sliding rod 1404-c is adjusted.

Figure 14B:
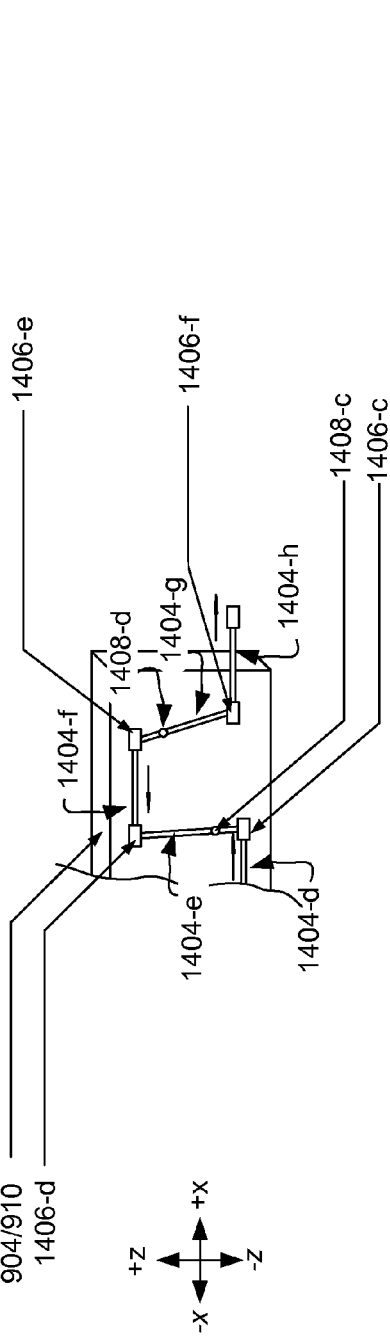

FIG. 14B illustrates a mechanism 1410 for magnifying movement from the cam gear 1202 (FIG. 12). When the cam gear 1202 rotates, it pushes a sliding rod 1404-d. Translational movement of the sliding rod 1404-d is transferred to a sliding rod 1404-e by a hinge joint 1406-c; from the sliding rod 1404-e to a sliding rod 1404-f by a hinge joint 1406-d; from the sliding rod 1404-f to a sliding rod 1404-g by a hinge joint 1406-e; and from the sliding rod 1404-g to a sliding rod 1404-h by a hinge joint 1406-f. The translational movement of the sliding rod 1404-d is magnified into the translational movement of the sliding rod 1404-h in accordance with respective leverage ratios provided by leverage supporting points 1408-c and 1408-d. In some implementations, greater numbers of leverage support points (e.g., more than two) are combined in a series. By adjusting respective positions of such leverage supporting points, translational movement can be further magnified.

FIG. 15A illustrates a perspective view of a mechanism 1500 for magnifying movement from the cam gear 1202. FIG. 15B is a top view of the same mechanism 1500. In this mechanism, the cam gear 1202 in x-y plane. The cam gear 1202 includes a cam ring 1504 having a predetermined profile (e.g., track shape). In some implementations, the cam ring 1504 has a predetermined profile that is a convex flange on top of a cam plate. In some implementations, the cam ring 1504 has a predetermined profile that is an embedded hollow ring. A cam carrier 1506 is rotated in x-y plane and the rotation is converted to translational movement of the sliding rods 1404. The sliding rods 1404, hinge joints 1406, and leverage supporting points 1408 are coupled with the lens moving units 904/910 in x-z plane. By adjusting respective positions of such leverage supporting points, translational movement can be magnified as described with reference to FIGS. 14A-14B.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles of the disclosure and its practical applications, to thereby enable others skilled in the art to best utilize the various implementations with various modifications as are suited to the particular use contemplated.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Throughout the preceding description, various implementations are described within the context of smart/cellular phone cameras. This is purely for convenience of explanation and is not intended to limit the claims that follow. Various implementations described can be implemented on hidden security imaging systems, miniature digital cameras, cameras embedded in a wide variety of mechanical and electrical devices, etc.

What is claimed is:

1. An optical apparatus, comprising:
   a first reflective component configured to reflect light from a first optical axis to an optical plane substantially perpendicular to the first optical axis;
   a first lens unit disposed within the optical plane;
   a second lens unit disposed within the optical plane; and
   an actuator mechanically coupled by a first transmission having a first transmission ratio with the first lens unit to cause a first displacement of the first lens unit from a first position within the optical plane to a second position within the optical plane and mechanically coupled by a second transmission having a second transmission ratio with the second lens unit to cause a second displacement of the second lens unit from a third position within the optical plane to a fourth position within the optical plane, wherein the first and second displacements occur concurrently with actuation of the actuator;
   wherein the first displacement of the first lens unit is compensated by the second displacement of the second lens unit such that light transmitted through the first lens unit in the first position and through the second lens unit in the third position is imaged with a first magnification at a respective focal plane and light transmitted through the first lens unit in the second position and through the second lens unit in the fourth position is imaged with a second magnification different from the first magnification at the respective focal plane, thereby effecting an optical zoom effect.

2. The optical apparatus of claim 1, further comprising:
   a second reflective component configured to reflect light transmitted through the first and second lens units from the optical plane to a second optical axis, wherein the second optical axis lies parallel to the first optical axis.

3. The optical apparatus of claim 2, wherein the respective focal plane is perpendicular to the second optical axis and the optical apparatus further comprises an imaging sensor disposed along the second optical axis.

4. The optical apparatus of claim 1, wherein the first reflective component reflects light from the first optical axis to a third optical axis in the optical plane; and
   the apparatus further comprises:
   a third reflective component configured to reflect light from the third optical axis to a fourth optical axis in the optical plane; and
   a fourth reflective component configured to reflect light from the fourth optical axis to a fifth optical axis in the optical plane.

5. The optical apparatus of claim 4, wherein:
   the first lens unit is disposed along the third optical axis and the second lens unit is disposed along the fifth optical axis.

6. The optical apparatus of claim 1, wherein the first reflective component reflects light from the first optical axis to a sixth optical axis in the optical plane; and
   the apparatus further comprises:
   a third reflective component configured to reflect light from the sixth optical axis to a seventh optical axis in the optical plane.

7. The optical apparatus of claim 6, wherein:
   the first lens unit is disposed along the sixth optical axis and the second lens unit is disposed along the seventh optical axis.

8. The optical apparatus of claim 1, wherein the apparatus is part of an optical zooming unit integrated into a mobile camera phone.

9. The optical apparatus of claim 8, wherein the apparatus is configured to be user-exchangeable.

10. An optical apparatus, comprising:
a first reflective component configured to reflect light from a first optical axis to an optical plane substantially perpendicular to the first optical axis;
a first lens unit disposed within the optical plane;
a second lens unit disposed within the optical plane;
an imaging sensor; and
an actuator mechanically coupled by a first transmission having a first transmission ratio with the first lens unit to cause a first displacement of the first lens unit from a first position within the optical plane to a second position within the optical plane and mechanically coupled by a second transmission having a second transmission ratio with the imaging sensor to cause a second displacement of the imaging sensor from a first focal plane to a second focal plane, wherein the first and second displacements occur concurrently with actuation of the actuator;
wherein the first displacement of the first lens unit is compensated by the second displacement of the imaging sensor such that light transmitted through the first lens unit in the first position and through the second lens unit is imaged with a first magnification at the first focal plane and light transmitted through the first lens unit in the second position and through the second lens unit is imaged with a second magnification different from the first magnification at the second focal plane, thereby effecting an optical zoom effect.

11. The optical apparatus of claim 10, further comprising:
a second reflective component configured to reflect light transmitted through the first and second lens units from the optical plane to a second optical axis, wherein the second optical axis lies parallel to the first optical axis.

12. The optical apparatus of claim 11, wherein the first and second focal planes are perpendicular to the second optical axis and the imaging sensor is disposed along the second optical axis.

13. The optical apparatus of claim 10, wherein the first reflective component reflects light from the first optical axis to a third optical axis in the optical plane; and
the apparatus further comprises:
a third reflective component configured to reflect light from the third optical axis to a fourth optical axis in the optical plane; and
a fourth reflective component configured to reflect light from the fourth optical axis to a fifth optical axis in the optical plane.

14. The optical apparatus of claim 13, wherein:
the first lens unit is disposed along the third optical axis and the second lens unit is disposed along the fifth optical axis.

15. The optical apparatus of claim 10, wherein the first reflective component reflects light from the first optical axis to a sixth optical axis in the optical plane; and
the apparatus further comprises:
a third reflective component configured to reflect light from the sixth optical axis to a seventh optical axis in the optical plane.

16. The optical apparatus of claim 15, wherein:
the first lens unit is disposed along the sixth optical axis and the second lens unit is disposed along the seventh optical axis.

17. The optical apparatus of claim 10, wherein the apparatus is part of an optical zooming unit integrated into a mobile camera phone.

18. The optical apparatus of claim 17, wherein the apparatus is configured to be user-exchangeable.

* * * * *